United States Patent [19]
Ballard, Jr.

[11] Patent Number: 5,992,559
[45] Date of Patent: Nov. 30, 1999

[54] REVERSIBLE POLARITY BOREHOLE SEISMIC DEVICE FOR P AND ENHANCED S-WAVE CROSSHOLE TESTING

[76] Inventor: Robert F. Ballard, Jr., 500 Trailwood Dr., Clinton, Miss. 39056

[21] Appl. No.: 09/216,142

[22] Filed: Dec. 18, 1998

[51] Int. Cl.[6] .................................................. G10K 11/00
[52] U.S. Cl. .......................... 181/0.5; 181/106; 181/121; 367/147
[58] Field of Search .................................. 181/106, 102, 181/0.5, 121; 367/25, 147

[56] References Cited

U.S. PATENT DOCUMENTS

| | | | |
|---|---|---|---|
| 2,993,553 | 7/1961 | Howes | 181/0.5 |
| 4,648,478 | 3/1987 | Dedole et al. | 181/106 |
| 5,137,109 | 8/1992 | Dorel | 181/106 |
| 5,305,287 | 4/1994 | Ballard, Jr. et al. | 367/147 |
| 5,534,668 | 7/1996 | Ogura | 181/106 |

*Primary Examiner*—Christine Oda
*Assistant Examiner*—Anthony Jolly
*Attorney, Agent, or Firm*—Kenneth S. Watkins

[57] ABSTRACT

A seismic source for crosshole testing comprises a hammer rod supported by axial bearings in the ends of a cylindrical housing. Fasteners attach a down-blow hammer to the hammer rod inside the housing. A helical spring inside the housing biases the hammer rod in a downward direction. A hammer cable, attached to the upper end of the hammer rod, raises the hammer rod against gravity and spring pressure until an up-blow hammer attached to the hammer rod below the cylindrical housing strikes the bottom end cap which serves as an anvil. Relaxation of the hammer cable tension results in the down-blow hammer striking the anvil. The device provides compression waves and highly repeatable and selectable-phase shear waves. The device is simple, light and operable by a single person.

20 Claims, 3 Drawing Sheets

REVERSIBLE POLARITY BOREHOLE SEISMIC DEVICE FOR P AND ENHANCED S-WAVE CROSSHOLE TESTING

BACKGROUND OF THE INVENTION

The present invention relates to crosshole seismic testing and data gathering and, more specifically, seismic sources for insertion in boreholes.

Crosshole seismic testing has been commonplace for a considerable time; first in the petroleum industry, and later used in a broader spectrum of geological engineering areas. Crosshole testing incorporates placement of a seismic source in one borehole, and a seismic receiver or geophone in another borehole. Analysis of the seismic data received by the geophone provides valuable information on soil types, soil compaction, deposits, faults, and other information useful in geological information.

Useful data and data analysis requires repeatable seismic sources and an ability to distinguish between shear and compression waves generated by the sources. Compression waves are characterized by wave front oscillation in the direction of wave propagation, while shear waves oscillate transversely to the direction of wave propagation. Earlier seismic sources, such as explosive or spark sources, produce primarily compression waves. An example of such a device is disclosed in U.S. Pat. No. 5,305,287 by the applicant. The shear waves are relatively weak and the phase relationship of successive events is random, limiting the usefulness of cumulative or "stacking" methods of data accumulation.

Other seismic sources utilize oscillating masses to provide shear or compression waves. One such device is disclosed in U.S. Pat. No. 5,137,109. These devices require complex hydraulic, electromagnetic, or pneumatic arrangements and require special equipment to transport and power the devices.

There is a substantial need for a simple, lightweight seismic source which provides accurate, repeatable compression and shear waves for seismic analysis.

OBJECTS AND SUMMARY OF THE INVENTION

Therefore an object of the present invention is to provide a seismic source for crosshole testing which can be transported, set-up, and used by a single person.

A further object of the present invention is to provide a seismic source which provides both compression and shear waves.

A further object of the present invention is to provide a seismic source having a means to control the phase of the shear wave produced by the source.

A further object of the present invention is to provide a seismic source in which the shear wave is highly repeatable in phase, whereby successive wave data may be "stacked" to reduce the effects of system and ambient noise.

Yet a further object of the present invention is to provide a seismic source which is simple and can be manufactured economically.

The seismic source of the present invention comprises an up-blow hammer and a down-blow hammer attached to a hammer rod which moves axially in a housing with respect to the axis of a borehole. The up-blow hammer strikes a bottom surface of an anvil attached to the housing when the hammer rod is propelled upward, producing a relatively weak compression wave and a relatively strong shear wave. The down-blow hammer strikes a top surface of an anvil attached to the housing when the hammer rod is propelled downward, producing a relatively weak compression wave and a relatively strong shear wave of opposite polarity of the shear wave from the up-blow hammer. A dampener, attached to the hammer rod reduces up-blow and down-blow hammer bounce when striking the respective anvil surfaces.

In the preferred embodiment the source comprises a cylindrical housing with the hammer rod extending through the body. Apertures in the top and bottom end caps of the housing support the hammer rod and act as axial bearings, allowing the hammer rod to move axially with respect to the housing. Fasteners attach a down-blow hammer to the hammer rod inside the housing. A second fastening means attaches an up-blow hammer to the hammer rod below the bottom end cap and outside of the housing.

A borehole locking device, such as a pneumatic bladder, locks the source at a desired position in a borehole with the hammer rod aligned with the axis of the borehole. A hammer cable, attached to the top end of the hammer rod provides a means for the operator to raise the hammer rod against gravity and spring force produced by a helical spring attached to the hammer rod inside the housing. The upward motion of the hammer rod continues until the up-blow hammer strikes the lower surface of the lower end cap of the housing. The striking contact between the up-blow hammer and the lower end cap, acting as an anvil, generates a relatively weak compression wave and a relatively strong shear wave having a given phase.

Upon release of the hammer cable, the combination of gravity and the spring force generated by compression of the helical spring drives the hammer rod in a downward direction. The hammer rod continues downward travel until the down-blow hammer inside the housing strikes the top surface of the bottom end cap. The striking motion of the down-blow hammer against the end cap generates a relatively weak compression wave and a relatively strong shear wave having a phase opposite of that caused by the up blow hammer striking the anvil. The lower end cap forms a common anvil component for the up-blow hammer and the down-blow hammer.

A dampener, attached to the bottom end of the hammer rod dampens the hammer rod motion upon striking the anvil and reduces bounce of the up-blow and down-blow hammers against the anvil. In the preferred embodiment, the dampener comprises a plurality of masses, such as lead shot, in a chamber. The action of the dampener is similar to a "dead-blow" hammer.

A geophone, attached to the housing provides a start timing signal to seismic analysis equipment through a two conductor electrical cable. A pneumatic hose provides a connection between a pneumatic source at the surface and the pneumatic bladder attached to the housing. A jacketed three-in-one cable houses the hammer cable, geophone transmission cable, and pneumatic hose and provides a means to conveniently lower and position the source in a borehole. A manual reel provides cable storage and a means to wrap and extend the cable.

A spacer having a C-shaped cross section surrounds the housing and provides a clamping surface opposite the pneumatic bladder to secure the source in the borehole. Spacers of different thicknesses provide a means to clamp the device in different diameter boreholes utilizing the same source.

The seismic source provides a compact device easily transported, set-up and used by a single individual. In the preferred embodiments the overall length of the device is approximately two feet, the body diameter is approximately three inches, and weighs about twelve pounds. The jacketed cable is one-half inch and of a length tailored to the application. The center frequency of the seismic waves is approximately 400 Hz. This frequency provides a recognizable signal well above the frequency of usual background traffic and electrical noise. The selectable phase of the shear wave and clean source signal resulting from the dampener make the signal highly repeatable. The source signal is easily "stacked" to provide excellent data with low noise.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The following is a description of the preferred embodiments of a seismic source device and cable reel assembly for crosshole testing.

Figure 1:
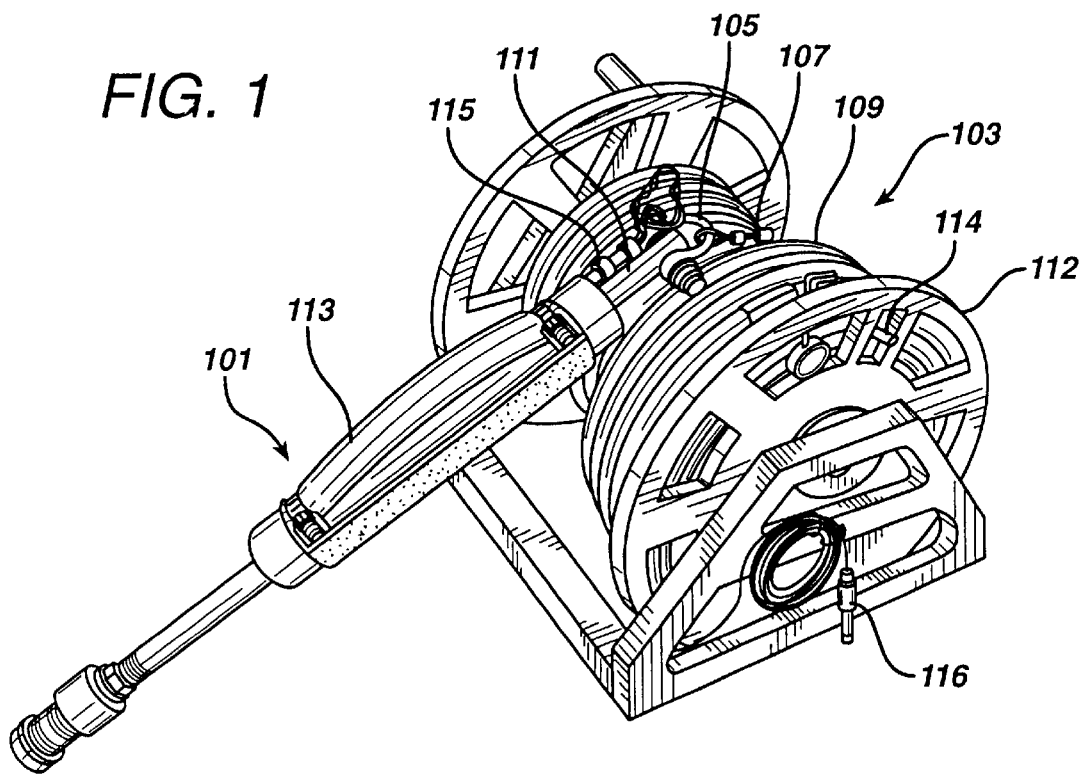
FIG. 1 is a perspective drawing of the seismic source and cable reel assembly of the present invention showing the hammer rod, pneumatic bladder and zero-time geophone connections to the surface via the jacketed cable.

FIG. 1 is a perspective drawing of the seismic source 101 and cable reel assembly 103. Shackle 105 connects hammer cable 107 of jacketed cable 109 to hammer rod 111. Reel 112 provides storage for jacked cable 109 and allows unwinding of cable 109 to lower seismic source 101 in a borehole (not shown). Pneumatic inlet connection 114 supplies air to pneumatic bladder 113 through a pneumatic hose (261 of FIG. 2) in jacketed cable 109. Geophone surface connection 116 connects to zero-time geophone 115 through an electrical cable (257 of FIG. 2).

Figure 2:
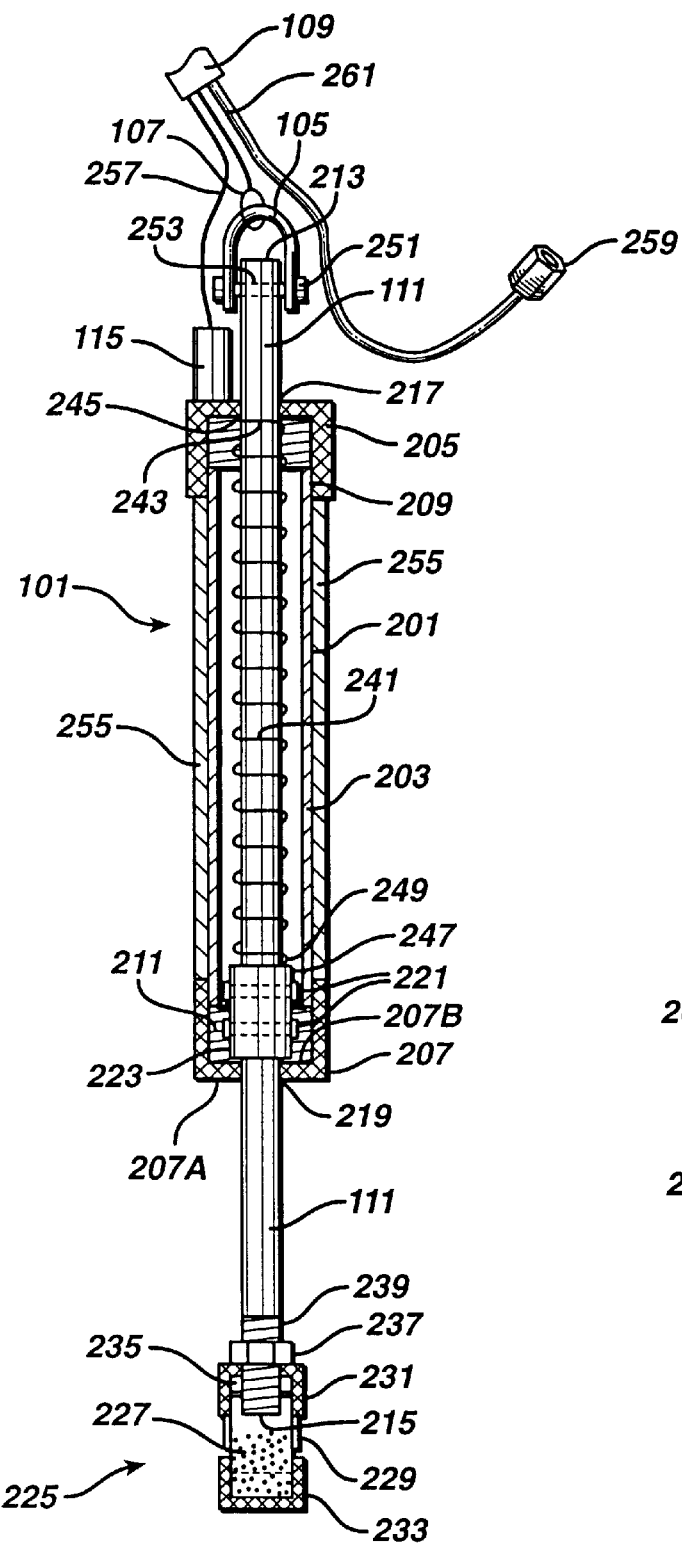
FIG. 2 is a elevation drawing and partial cross-section of the seismic source and connections to the hammer cable, transducer cable, and pneumatic hose.

FIG. 2 is an elevation and partial cross-section of seismic source 101. Pneumatic bladder 113 of FIG. 1 is omitted for clarity. Cylindrical housing 201 comprises pipe or body portion 203, upper end cap 205 and lower pipe cap or anvil 207. Upper threaded portion 209 of pipe or body portion 203 provides attachment for upper end cap 205 and lower threaded portion 211 provides attachment for anvil 207.

Hammer rod 111 extends from top or shackle end 213 to bottom or dampener end 215 and passes through opening 217 of upper end cap 205 and opening 219 of anvil 207. Openings 217 and 219 form sliding bearings for hammer rod 111, allowing hammer rod 111 to move axially with respect to the longitudinal axis of housing 201.

Figure 2A:
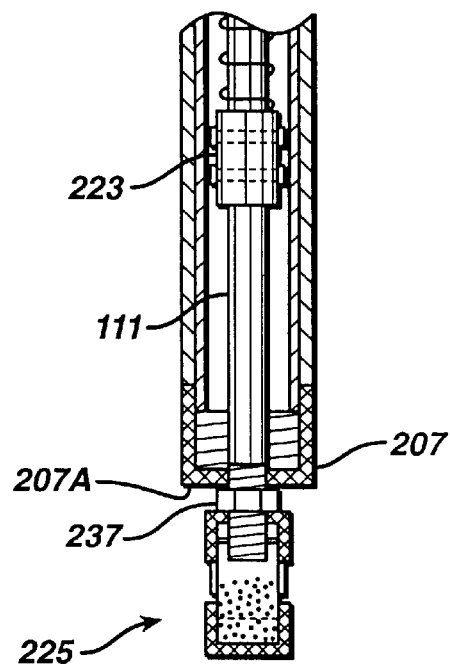
FIG. 2A is a partial elevation of the source of FIG. 2 with the up-blow hammer in contact with the anvil.

Fasteners 221 attach down-blow hammer 223 to hammer rod 111 inside housing 201. Dampener 225, comprising threaded nipple 229, top damper end cap 231 and bottom damper end cap 233 encloses lead shot 227. Top damper end cap 231 and bottom damper end cap 233 are threaded and engage the threads of threaded nipple 229. Locking nut 235 secures top dampener end cap 231 of dampener 225 against up-blow hammer 237. In the preferred embodiment, up-blow hammer 237 is a nut threaded on threaded portion 239 of hammer rod 111. Hammer rod 111 moves upward and axially with respect to cylindrical housing 201 until up-blow hammer 237 contacts lower surface 207A of anvil 207 as shown in FIG. 2A. Hammer rod 111 moves downward and axially with respect to cylindrical housing 201 until down-blow hammer 223 contacts upper surface 207B of anvil 207 as shown in FIG. 2.

In the preferred embodiments, lead shot such as No. 9 lead shot is used in dampener 225. Shot 227 is oiled to prevent excessive looseness of the shot. A space is provided between the top level of shot 227 and the bottom of top dampener cap 231. A resilient material such as foam rubber may be placed in the space. In other embodiments, other size or material shot may be used. In still other embodiments, other types of dampeners such as pneumatic, hydraulic or mechanical dampeners may be used.

Helical compression spring 241 surrounds hammer rod 111 inside cylindrical housing 201 with upper spring end 243 attached to retaining hole 245 of upper end cap 205. Retaining hole 247 of down-blow hammer 223 retains lower spring end 249. Besides providing motive force for down-blow hammer 223, spring 241 prevents excessive rotation of hammer rod 111 in housing 201. Shackle 105 attaches hammer cable 107 to hammer rod 111. Shackle bolt 251 of shackle 105, inserted in hole 253 of hammer rod 111 secures shackle 105 to end 213 of hammer rod 111.

Body spacer 255 has a generally C-shaped cross section and is made of a semi-rigid material such as polyvinyl chloride (PVC) pipe. Body spacer 255 snaps around body portion 203 between upper end cap 205 and anvil 207. Zero-time geophone 115, attached to upper end cap 205 of cylindrical housing 201 provides an electrical start signal upon down-blow hammer 223 contact with anvil 207 or up-blow hammer 237 contact with anvil 207. A two conductor electrical cable 257 connects enclosed zero-time geophone 115 with electrical connection 116 of FIG. 1. Upper hose coupling 259 of pneumatic hose 261 provides air to pneumatic bladder 113 of FIG. 1. FIG. 2A is a partial elevation of the seismic source of FIG. 2 showing up-blow hammer 237 in contact with lower surface 207A of anvil 207.

Figure 3:
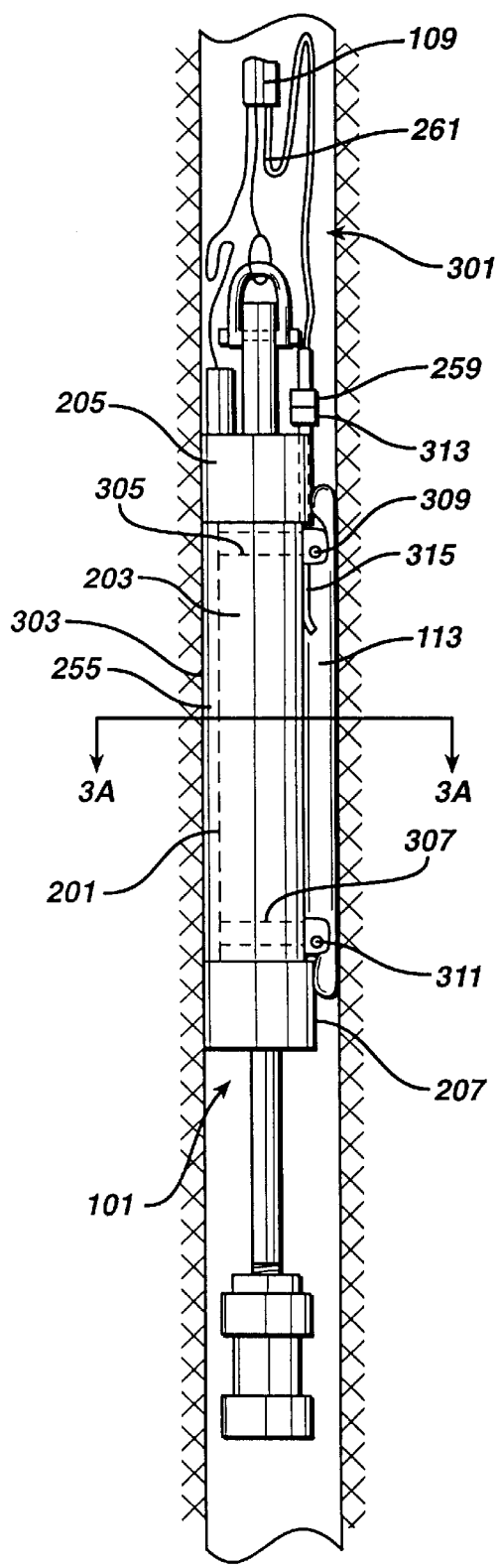
FIG. 3 is a elevation drawing of the seismic source of the present invention secured in a borehole by the pneumatic bladder.

FIG. 3 is a elevation drawing of the seismic source 101 secured in a borehole 301, shown in cross section. Pneumatic bladder 113 secures cylindrical housing 201 of seismic source 101 by forcing body spacer 255 against wall 303 of borehole 301. Upper hose clamp 305 and lower hose clamp 307 clamp bladder 113 against body portion 203. Body spacer 255 extends substantially the length of body portion 203 between upper end cap 205 and anvil 207. Hose clamp adjuster screws 309 and 311 provide a means for quickly securing, removing and adjusting pneumatic bladder 113 to body portion 203.

Pneumatic hose 261 of jacketed cable 109 supplies air and vents bladder 113 through a removable coupling formed by upper coupling 259 and lower coupling 313. Tube 315, connected to lower coupling 313 penetrates bladder 113 and is sealed in pneumatic bladder 113 by upper hose clamp 309.

Figure 3A:
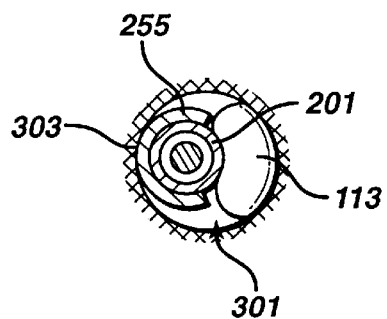
FIG. 3A is a cross-section of the source of FIG. 3A taken at lines 3A—3A.

FIG. 3A is a cross-section of seismic source 101 taken at lines 3A—3A of FIG. 3. Body spacer 255 is positioned opposite of cylindrical housing 201 from bladder 113. Sufficient air pressure (nominally 30–35 psi) provides sufficient force to force spacer 255 against wall 303 of borehole 301 to secure source 101 in the desired position.

Figure 3B:
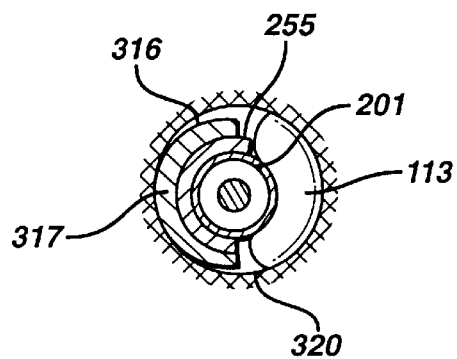
FIG. 3B is an alternative embodiment of the seismic source of FIG. 3 utilizing a laminated spacer to allow use in a larger diameter borehole.

FIG. 3B is an alternative embodiment showing a larger diameter borehole 320 and a large borehole spacer 316. Large borehole spacer 316 may be laminated by bonding a second spacer 317 to the outside surface of body spacer 255. Second spacer 317 has a C-shaped cross-section and provides engagement for seismic source 101 in a larger borehole. Large borehole spacer 316 allows use of source 101 in different diameter boreholes by changing spacer 316 thickness.

The materials of construction of the preferred embodiments are selected for availability, ease of assembly, ruggedness, and good corrosion resistance. For example, the body portion and threaded nipple of the dampener are threaded stainless steel pipe nipples in the preferred embodiments. End caps are threaded stainless steel pipe caps. Hammer rod 111 is stainless steel rod. Down-blow hammer 223 is a brass nut affixed with stainless steel fasteners. Up-blow hammer 237 is a brass nut threaded onto hammer rod 111. Pneumatic bladder 113 is made of rubber and double walled in the preferred embodiment to provide durability. Body spacer 255 is made from PVC pipe.

Cable 109 comprises hammer cable 107, electrical cable 257, and pneumatic hose 261 and provides an integral cable to prevent tangling when lowering, rising, or operating the seismic source 101. Hammer cable 107 is plastic coated aircraft stress cable and provides the principal stress member. Cable 109 jacket provides additional strength to the cable and provides abrasion and cutting protection to enclosed hammer cable 107, electrical cable 257, and pneumatic hose 261. Slack provided in electrical cable 257 and pneumatic hose 261 as shown in FIG. 3 allows raising and lowering hammer rod 111 with cable 109.

Figure 4:
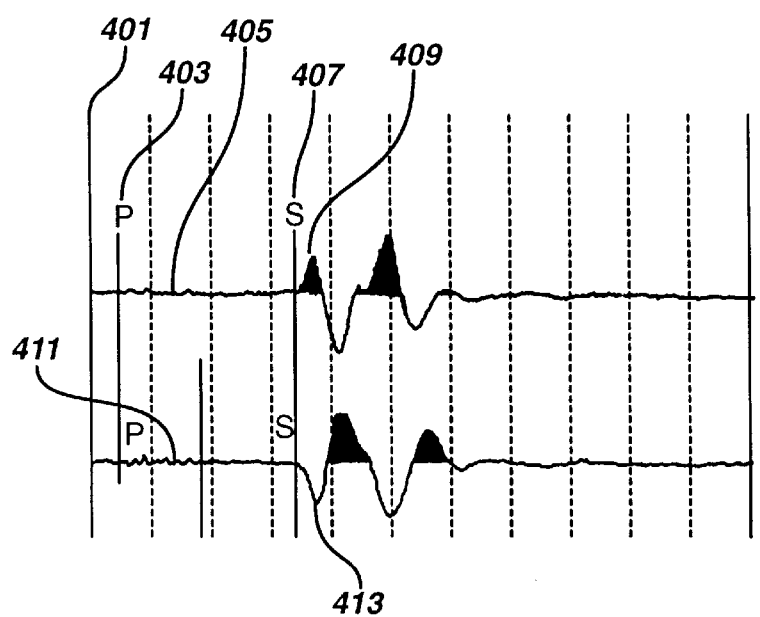
FIG. 4 is an amplitude vs. time graph of two signals from the seismic source of the present invention showing an up-blow hammer signal on the upper curve and a down-blow hammer signal on the lower curve.

FIG. 4 is an amplitude vs. time graph of seismic data recorded from a seismograph located in a borehole adjacent to the source of FIGS. 1–3. Line 401 represents the zero time start of the source wave, obtained from the zero-time geophone of the seismic source. Line 403 represents the arrival of the P or compression wave 405. Line 407 represents the arrival of the S or shear wave 409. The lower curve shows the arrival of the P(411) and S(413) waves of an opposite polarity seismic source event. For example, the upper curve represents a combined compression and shear wave created by the source of FIGS. 1–3 when up-blow hammer (237 of FIG. 2) strikes anvil 207. The lower curve represents a combined compression and shear wave created by the source of FIGS. 1–3 when down-blow hammer 223 strikes anvil 207. Note the opposite polarity of S waves 409 and 413.

Accordingly the reader will see that the REVERSIBLE POLARITY BOREHOLE SEISMIC DEVICE FOR P AND ENHANCED S-WAVE CROSSHOLE TESTING provides a seismic source which provides compression and shear waves suitable for seismic analysis. In addition, the device provides the following advantages:

The device is light and portable, allowing transport, set-up, and use by a single individual;

The seismic waves generated by the device are distinct, easily recognizable, and highly repeatable;

The polarity of the seismic shear waves generated by the device are reversible, adding further recognition and reliability of the waves;

The dampener reduces noise of the generated signals; and

The device is simple and low in cost.

Although the description above contains many specifications, these should not be construed as limiting the scope of the invention but as merely providing illustrations of some of the presently preferred embodiments of this invention. For example, the size, materials and masses utilized may be changed to adjust compression and shear wave frequencies. Other hammer propelling means such as elastomers or other elastics may be used to provide different wave amplitudes, etc. Thus the scope of the invention should be determined by the appended claims and their legal equivalents, rather than by the examples given.

I claim:

1. A seismic source device insertable in a borehole for crosshole testing comprising:

a housing comprising a first anvil surface and a second anvil surface, and a housing axis parallel with a longitudinal axis of the borehole when the seismic device is inserted and retained in the borehole;

a first hammer operably connected to the housing and translateable along a first axis parallel to the housing axis, the first hammer strikeable against the first anvil surface, the first hammer creating a first shear wave and a first compression wave in a medium surrounding the borehole when the first hammer strikes the first anvil surface in a first direction; and a second hammer operably connected to the housing and translateable along a second axis parallel to the housing axis, the second hammer strikeable against the second anvil surface, the second hammer creating a second shear wave and a second compression wave in the medium surrounding the borehole, the second shear wave of polarity opposite of the first shear wave when the second hammer strikes the second anvil surface in a second direction opposite of the first direction.

2. The seismic source device of claim 1 wherein the first hammer and the second hammer are attached to a hammer rod translateably supported by the housing and actuated from a surface location by a hammer cable attached to the hammer rod.

3. The seismic source device of claim 1 wherein the first anvil surface and the second anvil surface are opposite surfaces of a common anvil disposed on the housing between the first hammer and the second hammer.

4. The seismic source device of claim 2 wherein gravity acting on the first hammer provides a first strike force translating the first hammer against the first anvil surface.

5. The seismic source device of claim 2 wherein an upward pull force on the hammer cable provides a second strike force translating the second hammer against the second anvil surface.

6. The seismic source device of claim 4 wherein spring force exerted by a spring disposed in the housing and attached to the hammer rod supplements the first strike force translating the first hammer against the first anvil surface.

7. The seismic source device of claim 6 wherein the first hammer is enclosed within the housing of the seismic source.

8. The seismic source device of claim 3 wherein the common anvil is a bottom end cap attached to a bottom portion of the housing.

9. The seismic source device of claim 1 comprising a zero-time signal generator attached to the housing for providing a timing signal for crosshole testing.

10. The seismic source device of claim 9 wherein the zero-time signal generator is an enclosed geophone.

11. The seismic source device of claim 1 comprising a rebound dampener attached to the hammer rod to reduce rebound of the first hammer striking the first anvil surface and the second hammer striking the second anvil surface.

12. The seismic source device of claim 1 comprising a clamp element attached to the housing for clamping the device in a desired portion of the borehole.

13. The seismic source device of claim 12 comprising a first removable spacer comprising a first thickness and attachable to the housing opposite of the clamp element to provide a friction surface to retain the device in a first borehole.

14. The seismic source device of claim 13 comprising a second removable spacer comprising a second thickness attachable to the housing, the second removable spacer providing a friction surface to retain the device in a second borehole of larger diameter than the first borehole.

15. A seismic source device insertable in a borehole for crosshole testing comprising:
 a housing comprising a first anvil surface and a second anvil surface, and a housing axis parallel with a longitudinal axis of the borehole when the seismic device is inserted and retained in the borehole;
 a first hammer attached to a hammer rod, the hammer rod operably connected to the housing and translateable along a first axis parallel to the housing axis, the first hammer strikeable against the first anvil surface, the first hammer creating a first shear wave in a medium surrounding the borehole when the first hammer strikes the first anvil surface;
 a second hammer attached to the hammer rod, the second hammer strikeable against the second anvil surface, the second hammer creating a second shear wave in the medium surrounding the borehole of polarity opposite of the first shear wave when the second hammer strikes the second anvil surface; and
 a rebound dampener attached to the hammer rod, the rebound dampener comprising a plurality of loose mass elements enclosed in a dampener housing.

16. The seismic source device of claim 15 wherein the plurality of loose mass elements comprise lead shot.

17. A seismic source device insertable in a borehole for crosshole testing comprising:
 a housing comprising a first anvil surface and a second anvil surface, and a housing axis parallel with a longitudinal axis of the borehole when the seismic device is inserted and retained in the borehole;
 a first hammer attached to a hammer rod, the hammer rod operably connected to the housing and translateable along a first axis parallel to the housing axis, the first hammer strikeable against the first anvil surface, the first hammer creating a first shear wave in a medium surrounding the borehole when the first hammer strikes the first anvil surface;
 a second hammer attached to the hammer rod, the second hammer strikeable against the second anvil surface, the second hammer creating a second shear wave in the medium surrounding the borehole of polarity opposite of the first shear wave when the second hammer strikes the second anvil surface;
 a clamping element attached to the housing, the clamping element extendable to retain the device in a desired position in the borehole; and
 a removable spacer attached to a mounting surface of the housing wherein the spacer is opposite the clamping element, the spacer providing a friction surface to retain the device in the borehole.

18. The seismic source device of claim 17 wherein the spacer is a partial sleeve having a C-shaped cross section, the spacer clamped over the mounting surface of the housing.

19. A seismic source and reel assembly for crosshole testing comprising:
 an elongated source housing comprising a top cap, and an anvil disposed at the bottom of the housing;
 a hammer rod extending through a first aperture in the top cap and a second aperture in the anvil of the housing, the hammer rod translateable axially with respect to the housing;
 a first hammer attached to the hammer rod and disposed inside of the housing, the first hammer strikeably engageable with an upper strike surface of the anvil;
 a second hammer attached to the hammer rod and disposed below the housing, the second hammer strikeably engageable with a lower strike surface of the anvil;
 a reel assembly comprising a reel rotateable with respect to a reel support; and
 a hammer cable windable on the reel, the hammer cable operably attached to the hammer rod.

20. The seismic source and reel assembly of claim 19 comprising a cable jacket enclosing the hammer cable and a pneumatic hose connected to a pneumatic clamping element attached to the housing.

* * * * *